US012573523B2

(12) United States Patent
Ushiwata et al.

(10) Patent No.: US 12,573,523 B2
(45) Date of Patent: Mar. 10, 2026

(54) INSULATED WIRE

(71) Applicant: Proterial, Ltd., Tokyo (JP)

(72) Inventors: Takami Ushiwata, Tokyo (JP); Ikumi Ando, Tokyo (JP); Hajime Nishi, Tokyo (JP)

(73) Assignee: Proterial, Ltd., Tokyo (JP)

( * ) Notice: Subject to any disclaimer, the term of this patent is extended or adjusted under 35 U.S.C. 154(b) by 76 days.

(21) Appl. No.: 18/472,502

(22) Filed: Sep. 22, 2023

(65) Prior Publication Data

US 2024/0120129 A1 Apr. 11, 2024

(30) Foreign Application Priority Data

Oct. 7, 2022 (JP) ................................ 2022-162744

(51) Int. Cl.
*H01B 3/30* (2006.01)

(52) U.S. Cl.
CPC .................................... *H01B 3/307* (2013.01)

(58) Field of Classification Search
CPC ... H01B 3/30; H05K 3/30; H05K 3/40; H05K 5/06; C09D 9/142
USPC ...... 174/102 R–110 R, 110 F, 113 R–120 SR
See application file for complete search history.

(56) References Cited

U.S. PATENT DOCUMENTS 3,615,972 A * 10/1971 Morehouse, Jr. .......... C08J 9/32 523/210
4,730,088 A * 3/1988 Suzuki ................ H01B 7/0838 174/102 R
5,128,175 A * 7/1992 Yamanishi ........... H01B 7/0233 427/247
5,210,377 A * 5/1993 Kennedy ............ H01B 11/1839 174/107
5,393,929 A * 2/1995 Yagihashi ................. B32B 1/00 428/319.7
10,319,496 B2 * 6/2019 Fujimori .................. H02K 3/30
2015/0325333 A1 * 11/2015 Muto ........................ H02K 3/30 428/376

(Continued)

FOREIGN PATENT DOCUMENTS

EP 3979269 A1 4/2022
JP 2018067516 A * 4/2018 ............... H01B 7/02

(Continued)

OTHER PUBLICATIONS

Extended European Search Report issued on Feb. 26, 2024, in European Patent Application No. 23185488.6.

(Continued)

*Primary Examiner* — William H. Mayo, III
(74) *Attorney, Agent, or Firm* — Meunier Carlin & Curfman LLC

(57) ABSTRACT

The insulated wire has a conductor having a long shape, and an insulation film including multiple pores and covering the conductor, wherein an opening area ratio SR measured by a method below is 1% or less. The method of measuring the opening area ratio SR includes peeling the insulation film from the conductor; obtaining a SEM image showing an interface on a conductor side in the insulation film peeled; calculating an area S1 of an observation region that is at least a part of the SEM image; and an area S2 of portions where the multiple pores are open in the observation region; and calculating the opening area ratio SR by the following Formula: SR=(S2/S1)×100.

6 Claims, 4 Drawing Sheets

(56) References Cited

U.S. PATENT DOCUMENTS

2017/0236618 A1 8/2017 Fujimori et al.
2018/0033518 A1* 2/2018 Ota ...................... H01B 7/0208
2021/0343446 A1 11/2021 Muto et al.

FOREIGN PATENT DOCUMENTS

WO 2016072425 A1 5/2016
WO 2018180080 A1 10/2018

OTHER PUBLICATIONS

Notice of Reasons for Refusal mailed on Jan. 27, 2026, in Japanese Patent Application No. 2022-162744.

* cited by examiner

INSULATED WIRE

CROSS REFERENCE TO RELATED APPLICATIONS

This application claims the benefit of priority based on Japanese patent application No. 2022-162744 filed on Oct. 7, 2022 with the Japan Patent Office and the entire disclosure of which is incorporated herein by reference.

BACKGROUND

The present disclosure relates to an insulated wire.

The insulated wire, such as an enamel wire, includes a conductor and an insulation film. It is preferable that the insulation film has high Partial Discharge Inception Voltage (PDIV). One of the methods to increase the PDIV of an insulation film is to form some pores in the insulation film. The technique for forming the pores in the insulation film is disclosed, for example, in WO2016/072425.

SUMMARY

By forming the pores in the insulation film, many openings derived from the pores may be generated in an interface on a conductor side in the insulation film. In this case, the contact area between the insulation film and the conductor is reduced by the openings, resulting in a decrease in adhesion between the conductor and the insulation film.

In one aspect of the present disclosure, it is preferable to provide an insulated wire that can inhibit a decrease in adhesion between an insulation film including pores and a conductor, and a method for manufacturing the insulated wire.

One aspect of the present disclosure is an insulated wire comprising a conductor having a long shape, and an insulation film including multiple pores and covering the conductor. An opening area ratio SR measured by a method below is 20% or less.

The method of measuring the opening area ratio SR:peeling the insulation film from the conductor; obtaining a SEM image showing an interface on a conductor side in the insulation film peeled; calculating an area S1 of an observation region that is at least a part of the SEM image, and an area S2 of portions where the multiple pores are open in the observation region; and calculating the opening area ratio SR by Formula (1) below.

$$SR=(S2/S1)\times 100 \qquad \text{Formula (1)}$$

The insulated wire according to one aspect of the present disclosure can inhibit a decrease in adhesion between the insulation film with the pores and the conductor.

BRIEF DESCRIPTION OF THE DRAWINGS

Some embodiments of the present disclosure will be described hereinafter by way of example with reference to the accompanying drawings, in which.

DETAILED DESCRIPTION OF EXEMPLARY EMBODIMENTS

The embodiments of the present disclosure will be described by way of example with reference to the drawings.

1. Configuration of Insulated Wire 1

Figure 1:
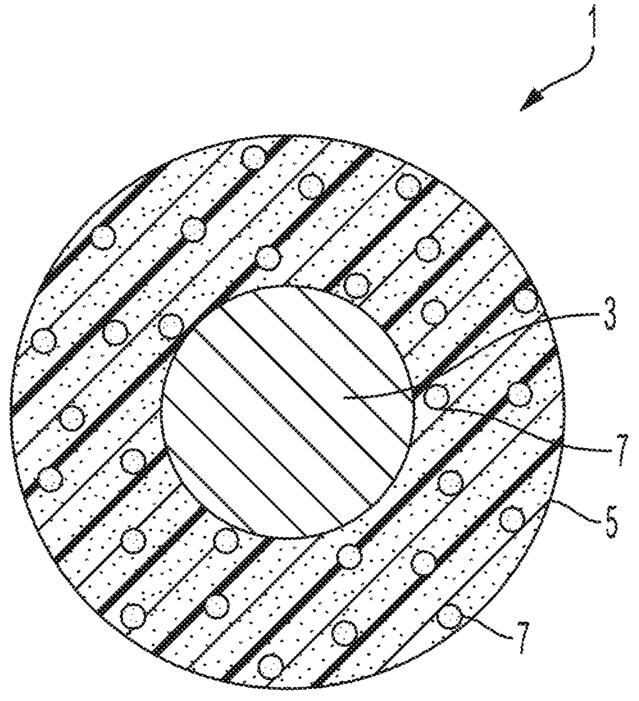
FIG. 1 is a sectional view showing a configuration of an insulated wire.

An insulated wire 1 of the present disclosure comprises a conductor 3 and an insulation film 5 as shown in FIG. 1. The conductor 3 has a long shape. The cross-sectional shape of the conductor 3 in a cross section perpendicular to an axial direction of the conductor 3 is not particularly limited. The cross-sectional shape of the conductor 3 may be, for example, circular or rectangular.

Materials of the conductor 3 may include, for example, a metallic material commonly used as a material of an electric wire. Examples of the metallic material may include copper, an alloy containing copper, aluminum, and an alloy containing aluminum. Examples of the copper may include low oxygen copper having an oxygen content of 30 ppm or less and oxygen free copper. It is preferable that the conductor 3 has a diameter of 0.4 mm or more and 3.0 mm or less.

When the cross-sectional shape of the conductor 3 is rectangular, for example, it is preferable that a size in a direction along a longer axis of the rectangle (i.e., size in a width direction) is 1.0 mm or more and 5.0 mm or less, and it is preferable that a size in a direction along a minor axis of the rectangle (i.e., size in a thickness direction) is 0.5 mm or more and 3.0 mm or less.

The insulation film 5 covers the conductor 3. The insulation film 5 is on an outer circumference side of the conductor 3. Materials of the insulation film 5 may include, for example, a material having an insulation property and a thermosetting property. Examples of the material of the insulation film 5 may include resins. Examples of the resins may include polyimide. Examples of the polyimide may include a wholly aromatic polyimide. Materials of the insulation film 5 may include diamine which is a silicone monomer and in which at least a part of a main chain is composed of a siloxane bond (—Si—O—Si—), or materials polymerized by dianhydride.

The insulation film 5 has a film thickness of, for example, 10 μm or more and 200 μm or less. The insulation film 5 has a structure in which multiple insulating layers are stacked, for example. The number of stacked insulating layers is, for example, 3 or more and 60 or less.

As shown in FIG. 1, the insulation film 5 includes multiple pores 7. For example, the multiple pores 7 are dispersed in the insulation film 5.

Hereinafter, one of the pores 7 is described; however, the following description will be applied to all the multiple pores 7. One pore 7 is a space in which gas is included. Examples of the gas may include air and gases generated when heat decomposable polymers described below are decomposed. It is preferable that a diameter of the pore 7 is 2 μm or less. When the pore 7 has a spherical shape, the diameter of the pore 7 is a spherical diameter. When the pore 7 has a spheroid shape, the diameter of the pore 7 is a diameter along a longer axis of the spheroid. Note that the spheroid is a three-dimensional shape generated by rotating an ellipse around its longer axis. When the pore 7 has any other three-dimensional shape, the diameter of the pore 7 is a maximum value of the lengths of the pore 7 measured in any directions.

The diameter of the pore 7 as used herein is a diameter of one independent pore 7. The diameter of the pore 7 as used herein does not include a diameter of a space generated by several pores 7 connected to each other during a process of forming the insulation film 5, or a diameter of a space generated by several pores 7 connected to each other after the formation of the insulation film 5.

A ratio of a volume of the multiple pores 7 (a volume obtained by adding all the volumes of the multiple pores 7) to a total volume of the insulation film 5 is defined as a porosity. The unit of the porosity is % by volume. The porosity is a value calculated by the following Formula (A).

$$\text{Porosity (\% by volume)}=((\rho1-\rho2)/\rho1)\times100 \quad \text{Formula (A)}$$

Here, "ρ1" is a specific gravity of an insulation film made of the same material as the insulation film 5 that is a target for the measurement of the porosity but without pores. "ρ2" is a specific gravity of the insulation film 5, which is the target for the measurement of the porosity.

A method for obtaining ρ1 is as follows. The method is basically similar to that for the insulated wire 1, which is a target for the measurement; however, the method is different in that an insulated wire without pores is prepared. From the insulated wire, a portion of 1.0 m in length is cut out and used as a measurement sample. The cut-out insulated wire is immersed in ethanol, and a weight W1A of the insulated wire and a specific gravity ρ1A of the insulated wire are calculated. Then, an insulation film is removed from the insulated wire, and a conductor is obtained. Next, the conductor is immersed in ethanol, and a weight W1B of the conductor and a specific gravity ρ1B of the conductor are calculated. Then, W1B is subtracted from W1A, whereby a weight W1C of the insulation film is calculated. The specific gravity ρ1 of the insulation film is calculated from the following Formula (B).

$$\rho1=W1C/(W1A/\rho1A-W1B/\rho1B) \quad \text{Formula (B)}$$

A method for obtaining ρ2 is as follows. From the insulated wire 1, which is the target for the measurement, a portion of 1.0 m in length is cut out and used as a measurement sample. The insulated wire 1 is immersed in ethanol, and a weight W2A of the insulated wire 1 and a specific gravity ρ2A of the insulated wire 1 are calculated. Then, the insulation film 5 is removed from the insulated wire 1, and the conductor 3 is obtained. Next, the conductor 3 is immersed in ethanol, and a weight W2B of the conductor 3 and a specific gravity ρ2B of the conductor 3 are calculated. Then, W2B is subtracted from W2A, whereby a weight W2C of the insulation film 5 is calculated. The specific gravity ρ2 of the insulation film 5 is calculated from the following Formula (C).

$$\rho2=W2C/(W2A/\rho2A-W2B/\rho2B) \quad \text{Formula (C)}$$

The porosity is preferably 1% by volume or more and 30% by volume or less, and more preferably 4% by volume or more and 20% by volume or less. When the porosity is 1% by volume or more, a relative dielectric constant of the insulation film 5 is even lower. When the porosity is 4% by volume or more, the relative dielectric constant of the insulation film 5 is especially low. With the porosity of 30% by volume or less, it is possible to inhibit a decrease in the strength of the insulation film 5, whereby collapse and/or cracks are less likely to occur in the insulation film 5 during a process of forming a coil. When the porosity is 20% by volume or less, the effect is more remarkable.

The insulation film 5 may include, for example, a hollow fine particle. The hollow fine particle is a particle having a plurality of pores. For example, at least a part or all of the multiple pores 7 in the insulation film 5 may be formed of the hollow fine particles.

Figure 4:
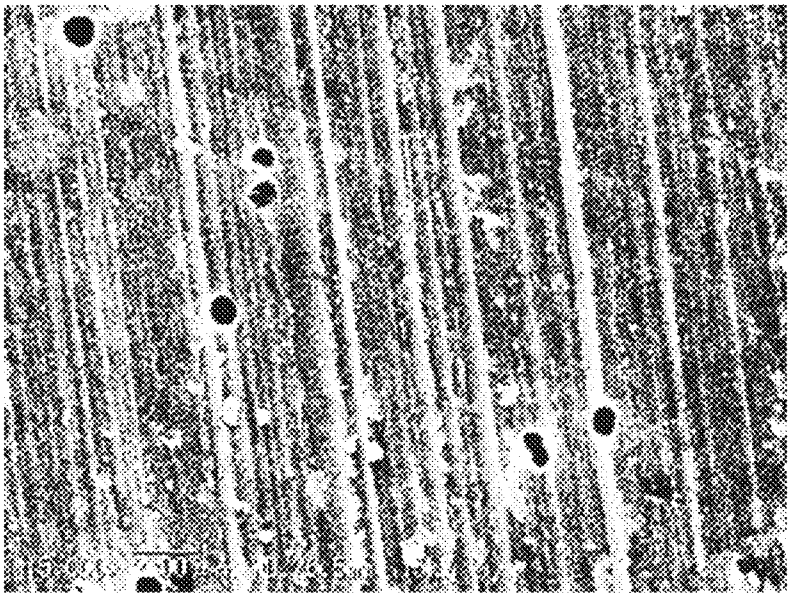
FIG. 4 is a SEM image showing an interface on a conductor side in a peeled insulation film.

A value measured by the following method is referred to as an opening area ratio SR. An edged tool is used to make a cut into an interface between the insulation film 5 and the conductor 3, and the insulation film 5 is peeled from the conductor 3. A SEM image showing an interface on a conductor 3 side in the peeled insulation film 5 is obtained. FIG. 4 shows an example of the SEM image. The SEM image shown in FIG. 4 is a SEM image obtained in Example 1 described below. When the SEM image is obtained, Keyence VE series is used as an electron microscope. The accelerating voltage of the electron microscope is 15 kV. The magnification of the SEM image is 5000 times.

An area S1 of an observation region that is at least a part of the SEM image, and an area S2 of portions where the multiple pores 7 are open in the observation region are calculated. The following Formula (1) is used to calculate the opening area ratio SR. The unit of the opening area ratio SR is %.

$$SR=(S2/S1)\times100 \quad \text{Formula (1)}$$

The area S1 is 420 $\mu m^2$. The area S2 is calculated as follows. First, the luminance in each pixel of the SEM image is binarized. Specifically, when the luminance of an arbitrary pixel exceeds a threshold, the pixel is deemed as a white pixel. When the luminance of an arbitrary pixel is less than the threshold, the pixel is deemed as a black pixel. The threshold is adjusted as appropriate so that each of the multiple pores can be properly recognized. The threshold is adjusted so that a pore portion (an opening portion) is shown in black pixels, and other portions are shown in white pixels. For a pore that cannot be recognized by binarization, the pore is encircled to thereby be recognized as a pore.

In the binarized SEM image, an area of portions occupied by the black pixels is calculated. The area of the portions occupied by the black pixels is referred to as S2. Since the luminance of the pore 7 (opening portion) is lower than other portions, in the binarized SEM image, the portion occupied by the black pixels can be recognized as the pore 7 (opening portion).

In the insulated wire 1 of the present disclosure, the opening area ratio SR is 20% or less. When the opening area ratio SR is 20% or less, the contact area between the conductor 3 and the insulation film 5 is large, and the adhesion between the conductor 3 and the insulation film 5 is high. The opening area ratio SR is preferably 15% or less, and more preferably 1% or less. When the opening area ratio SR is 15% or less, the adhesion between the conductor 3 and the insulation film 5 is higher. When the opening area ratio SR is 1% or less, the adhesion between the conductor 3 and the insulation film 5 is particularly high.

The opening area ratio SR is preferably 0.01% or more, and more preferably 0.02% or more. When the opening area ratio SR is 0.01% or more, the relative dielectric constant of the insulation film 5 is even lower. When the opening area ratio SR is 0.02% or more, the relative dielectric constant of the insulation film 5 is particularly low.

Examples of the insulated wire 1 may include enamel wires. The enamel wires are used, for example, for winding wires of motors. Examples of the motors may include drive motors for electric vehicles. Examples of the electric vehicles may include Hybrid Electric Vehicle (HEV), Electric Vehicle (EV), and Plug-in Hybrid Electric Vehicle (PHEV).

2. Method of Manufacturing Insulated Wire 1

The insulated wire 1 of the present disclosure can be manufactured, for example, by the following method.

(2-1) Preparation of Coating Material

A coating material used to form the insulation film 5 is prepared. The coating material includes a first component that is a material of the insulation film 5 (except for a material for the pore 7), a second component to form the multiple pores 7, and a solvent. The multiple pores 7 in the insulated wire 1 are derived from the second component (which is described in detail below).

Examples of the first component may include a thermosetting resin. Examples of the thermosetting resin may include polyimide, for example. Examples of the polyimide may include a wholly aromatic polyimide comprising diamine and tetracarboxylic dianhydride.

The wholly aromatic polyimide comprises, as essential diamine, 4,4'-diaminodiphenyl ether (ODA). The wholly aromatic polyimide may comprise, as diamine other than ODA, 1,4-bis(4-aminophenoxy)benzene (TPE-Q), 1,3-bis(4-aminophenoxy)benzene (TPE-R), 1,3-bis(3-aminophenoxy)benzene (APB), 4,4'-bis(4-aminophenoxy)biphenyl, and the like.

The wholly aromatic polyimide comprises, as essential tetracarboxylic dianhydride, pyromelletic dianhydride (PMDA). The wholly aromatic polyimide may comprise, as tetracarboxylic dianhydride other than PMDA, 3,3',4,4'-benzophenonetetracarboxylic dianhydride (BTDA), 3,3',4,4'-diphenylsulphontetrac arboxylic dianhydride (DSDA), 4,4'-oxydiphthalic dianhydride (ODPA), 4,4'-(2,2-hexafluoroisopropylidene)diphthalic dianhydride (6FDA), 3,3',4,4'-biphenyltetracarboxylic dianhydride (BPDA), and the like.

Examples of the first component may include diamine which is a silicone monomer and in which at least a part of a main chain is composed of a siloxane bond (—Si—O—Si—), or a material polymerized by dianhydride.

Examples of the second component may include a pore-forming agent, a core/shell type fine particle, a hollow fine particle, and the like. Examples of the pore-forming agent may include a thermally decomposable polymer in a form of fine particles or liquid, and a high boiling point solvent.

Examples of the thermally decomposable polymer in the form of fine particles may include cross-linked acrylic fine particles and cross-linked polystyrene fine particles. Examples of the thermally decomposable polymer in the form of liquid may include a diol-type polypropylene glycol (PPG) with hydroxyl groups at both ends.

Examples of the diol-type polypropylene glycol may include a diol-type polypropylene glycol (PPG400) with a molecular weight of 400. When the thermally decomposable polymer in the form of liquid is used as the pore-forming agent, compared with a case where the thermally decomposable polymer in the form of fine particles is used as the pore-forming agent, the compatibility between the second component and the solvent is improved, thereby making it easier to achieve the opening area ratio SR of 0%. When the thermally decomposable polymer in the form of liquid is used, the thermally decomposable polymer is compatible with the coating material through the solvent.

On the other hand, when the thermally decomposable polymer in the form of fine particles is used as the thermally decomposable polymer, the thermally decomposable polymer is not compatible with the coating material, and the thermally decomposable polymer in the form of fine particles is dispersed in the coating material. The thermally decomposable polymer in the form of liquid, which is excellent in the compatibility with the coating material, can form a state in which the thermally decomposable polymer and polyamic acid is phase-separated when the coating material is heated and the solvent is evaporated. It is considered that these processes allow to form the insulation film 5 in which the pore 7 is not included in the interface with the conductor 3 (i.e., the opening area ratio SR is 0%).

Especially, when the diol-type polypropylene glycol is used as the pore-forming agent, it is possible to achieve the opening area ratio SR of 0%. As the high boiling point solvent, the one with a boiling point of 260° C. or higher may be used, for example. Examples of the high boiling point solvent with the boiling point of 260° C. or higher may include oleyl alcohol, 1-tetradecanol, and 1-dodecanol. Among these high boiling point solvents, when 1-tetradecanol or 1-dodecanol is used as the pore-forming agent, it is possible to achieve the opening area ratio SR of 20% or less and increase a diameter of each pore 7 formed in the insulation film 5, making it possible to enhance the porosity in the insulation film 5 while reducing the content of the pore-forming agent relative to the coating material.

The core/shell type fine particle comprises a core fine particle and a shell. The shell covers the core fine particle. The core fine particle is made of a thermally decomposable polymer in the form of a fine particle, for example.

When the mass of the first component included in the coating material is 100 parts by mass, the mass of the second component included in the coating material is preferably 10 parts by mass or more and 60 parts by mass or less. Note that the coating material corresponds to a material of the insulation film 5.

Examples of the solvent contained in the coating material may include N-methyl-2-pyrrolidone (NMP) and dimethylacetamide (DMAc).

(2-2) Formation of Coating Film

The coating material is applied around the conductor 3 to form a coating film. The thickness of the coating film can be adjusted by the following method using a die, for example. The die has a through hole. First, a coating film is formed thicker than a desired thickness around the conductor 3. Then, the conductor 3 is passed through the through hole. At this time, a part of the outer periphery of the coating film is removed by the die. As a result, the thickness of the coating film is adjusted.

(2-3) Heating

The conductor 3 with the coating film is placed in the furnace. The temperature inside the furnace is, for example, within a range from 300° C. to 500° C. In the furnace, the solvent included in the coating film is removed. In the furnace, the multiple pores 7 are generated due to the second component. When the second component is the pore-forming agent, the pore-forming agent is vaporized, whereby the multiple pores 7 are generated. When the second component is the thermally decomposable polymer, the thermally decomposable polymer is thermally decomposed and vaporized, whereby the multiple pores 7 are generated. When the second component is the core/shell type fine particles, the core fine particles are thermally decomposed and vaporized, whereby the multiple pores 7 are generated. When the second component is the hollow fine particles, the pores of the hollow fine particles are the multiple pores 7 in the insulation film 5. The larger the amount of the second component contained in the coating material is, the higher the porosity becomes.

(2-4) Repetition of Processes

By performing the above processes of (2-1) to (2-3) once, one insulating layer is formed. Then, by repeating the processes of (2-2) to (2-3) N times, the insulation film 5 in which (N+1) insulating layers are stacked with each other is formed. "N" is a natural number of 2 or more and 59 or less.

3. Effects of Insulated Wire 1

(3-1) The Insulation film 5 includes the multiple pores 7. Thus, the insulation film 5 has a low relative dielectric constant. The opening area ratio SR is 20% or less. Thus, the adhesion between the conductor 3 and the insulation film 5 is high.

(3-2) The opening area ratio SR is 0.01% or more, for example. When the opening area ratio SR is 0.01% or more, the adhesion between the conductor 3 and the insulation film 5 is high and the relative dielectric constant is low.

(3-3) The porosity is 4% by volume or more, for example. When the porosity is 4% by volume or more, the adhesion between the conductor 3 and the insulation film 5 is high, and the relative dielectric constant can be further lowered.

(3-4) Among the multiple pores 7, at least some of the pores 7 are, for example, the pores of the hollow fine particles included in the insulation film 5. In this case, the relative dielectric constant of the insulation film 5 is even lower.

(3-5) The method of manufacturing the insulated wire 1 includes a process of blending the thermally decomposable polymer or the core/shell type fine particles with the coating material, and then thermally decomposing the thermally decomposable polymer or the core fine particles included in the core/shell type fine particles, thereby forming the pores 7. In this case, the opening area ratio SR can be further reduced.

4. Examples (4-1) Production of Insulated Wire 1

The insulated wires 1 of Examples 1~4 and Comparative Example 1 were manufactured by a method described in "2. Method of Manufacturing Insulated Wire 1". The composition of the coating material used to form the insulation film 5 is shown in Table 1. The unit for the blending amount of the component of the coating material in Table 1 is parts by mass. "Resin" in Table 1 corresponds to the first component. "Polyimide" in Table 1 specifically means the wholly aromatic polyimide. The monomers composing the wholly aromatic polyimide are monomers including PMDA and ODA. The "thermally decomposable polymer" in Table 1 is the cross-linked acrylic fine particles. The "high boiling point solvent" in Table 1 is specifically oleyl alcohol. In Examples 1-2, Comparative Example 1, and Examples 3-4, a speed when forming the insulating layer constituting the insulation film 5 was adjusted, whereby the porosity and the opening area ratio SR were changed.

TABLE 1

| | | | Example 1 | Example 2 | Example 3 | Example 4 | Comparative Example 1 |
|---|---|---|---|---|---|---|---|
| Components of coating material | Resin | Polyimide | 100 | 100 | 100 | 100 | 100 |
| | Pore-forming agent | Thermally decomposable polymer | — | — | 35 | 35 | — |
| | | High boiling point solvent | 20 | 20 | — | — | 20 |
| | Solvent | Dimethylacetamide | 400 | 400 | 400 | 400 | 400 |
| Porosity (% by volume) | | | 4 | 11 | 9 | 9 | 15 |
| Opening area ratio SR (%) | | | 0.82 | 13.1 | 0.04 | 0.16 | 38.3 |
| Number of rotation at peeling (times) | | | 116 | 103 | 99 | 102 | 53 |

Examples 1-4 and Comparative Example 1 had the following points in common. The material of the conductor 3 was tough pitch copper. The diameter of the conductor 3 was approximately 0.8 mm. The film thickness of the insulation film 5 was approximately 35 μm. The coating material is applied around the conductor 3, and the resultant was heated at the temperature of 350° C. to 500° C. to thereby form an insulating layer. These processes were repeated several times to stack multiple insulating layers, and the insulation film 5 including the pores 7 was formed.

(4-2) Measurement of Opening Area Ratio SR and Porosity

For each of the Examples 1~4 and Comparative Example 1, the opening area ratio SR and the porosity were measured. FIG. 4 shows the SEM image used to calculate the opening area ratio SR of Example 1. The SEM image of FIG. 4 shows the interface on the conductor 3 side in the peeled insulation film 5.

The opening area ratios SR of Examples 1-4 were smaller than the opening area ratio SR of Comparative Example 1. The speed at which the insulating layer was formed in Examples 1-2 was slower than a speed at which the insulating layer was formed in Comparative Example 1. The speed at which the insulating layer was formed in Example 3 was slower than a speed at which the insulating layer was formed in Example 4. From this, it is inferred that a heating rate in the interface between the insulating layer and the conductor 3 was faster (i.e., a speed at which the coating material is hardened was faster) in Examples 1-2 than that of Comparative Example 1, and thus, at least, the formation of the multiple pores 7 in the interface on the conductor 3 side in the insulating layer is inhibited, whereby the opening area ratio SR became small.

(4-3) Peel Test

A peel test was performed on each of the Examples 1-4 and Comparative Example 1. The method of the peel test is as follows.

Figure 2:
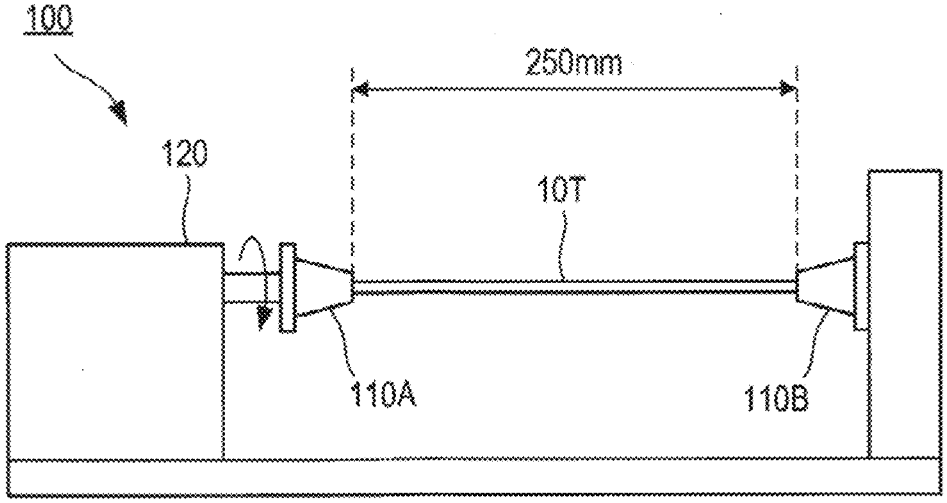
FIG. 2 is an illustration showing a configuration of a device used in a peel test.

The insulated wire 1 is cut in a cross section orthogonal to the axial direction to thereby obtain a test specimen 10T. The length of the test specimen 10T in the axial direction is 25 cm. A test device 100 shown in FIG. 2 is prepared. The test device 100 comprises grippers 110A, 110B. The grippers 110A, 110B face each other across a space. The distance between the gripper 110A and the gripper 110B is 25 cm.

One end of the test specimen 10T is gripped by the gripper 110A. The other end of the test specimen 10T is gripped by the gripper 110B.

The gripper 110A is attached to a rolling mechanism 120. The rolling mechanism 120 can rotate the gripper 110A. The rotation of the gripper 110A is a rotation around a central axis of the test specimen 10T. The gripper 110B is fixed not to be rotated.

Figure 3:
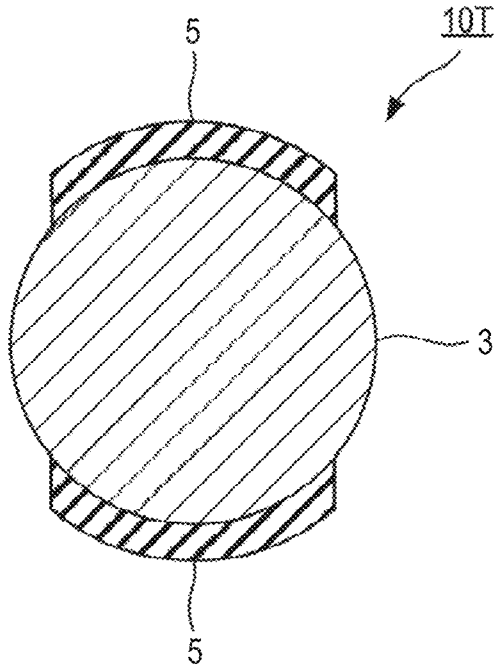
FIG. 3 is a sectional view showing a form of a specimen when a part of an insulation film is removed.

Then, as shown in FIG. 3, a part of the insulation film 5 of the test specimen 10T is removed. The areas from which the insulation film 5 is removed are two opposing areas across the conductor 3 when the test specimen 10T is seen from the axial direction. The areas from which the insulation film 5 is removed extend from one end to the opposite end of the test specimen 10T in the axial direction of the test specimen 10T. The conductor 3 is exposed in the areas from which the insulation film 5 is removed.

Then, the rotation of the gripper 110A is started. The rotation of the gripper 110A is continued until the insulation film 5 of the test specimen 10T is peeled from the conductor 3. The accumulated number of rotations of the gripper 110A from the start of the rotation to the peel-off of the insulation film 5 of the test specimen 10T from the conductor 3 is referred to as "number of rotations at peeling". The greater the number of rotation at peeling is, the higher the adhesion between the conductor 3 and the insulation film 5 is. Table 1 shows the measurement result of the number of rotation at peeling. Examples 1-4 required greater number of rotations at peeling than Comparative Example 1. It is inferred that reasons why Examples 1-4 required the greater number of rotations at peeling is that the opening area ratios SR were small, and the adhesion between the conductor 3 and the insulation film 5 was high.

5. Other Embodiments

The embodiments of the present disclosure have been described; however, the present disclosure may be embodied in various forms without limited to the above-described embodiments.

(5-1) A function served by a single element in each embodiment may be achieved by a plurality of elements, or a function served by a plurality of elements may be achieved by a single element. A part of the configurations of each embodiment may be omitted. At least part of the configurations of each embodiment may be added to or replaced with the configurations of other embodiments.

(5-2) The present disclosure can be embodied in various forms other than the insulated wire 1, such as in the form of a motor comprising the insulated wire 1 and in the form of a method of manufacturing the insulation film 5.

6. Technical Ideas Disclosed Herein

[Item 1]

An insulated wire comprising:

a conductor having a long shape; and an insulation film including multiple pores and covering the conductor, wherein an opening area ratio SR measured by a method below is 20% or less.

The method of measuring the opening area ratio SR:peeling the insulation film from the conductor; obtaining a SEM image showing an interface on a conductor side in the insulation film peeled; calculating an area S1 of an observation region that is at least a part of the SEM image, and an area S2 of portions where the multiple pores are open in the observation region; and calculating the opening area ratio SR by Formula (1) below.

$$SR=(S2/S1)\times 100 \quad \text{Formula (1)}$$

[Item 2]

The insulated wire according to item 1, wherein the opening area ratio SR is 0.01% or more.

[Item 3]

The insulated wire according to item 1 or 2, wherein the insulation film has a porosity of 4% by volume or more.

[Item 4]

The insulated wire according to any one of items 1 to 3, wherein the multiple pores are derived from a thermally decomposable polymer in a form of liquid, or a high boiling point solvent.

[Item 5]

The insulated wire according to item 4, wherein the thermally decomposable polymer in the form of liquid is diol-type polypropylene glycol.

[Item 6]

The insulated wire according to item 4, wherein the high boiling point solvent is oleyl alcohol, 1-tetradecanol, or 1-dodecanol.

What is claimed is:

1. An insulated wire comprising:

a conductor having a long shape; and an insulation film including multiple pores and covering the conductor, wherein an opening area ratio SR measured by a method below is 1% or less:

the method of measuring the opening area ratio SR:

peeling the insulation film from the conductor;

obtaining a SEM image showing an interface on a conductor side in the insulation film peeled;

calculating an area S1 of an observation region that is at least a part of the SEM image, and an area S2 of portions where the multiple pores are open in the observation region; and calculating the opening area ratio SR by Formula (1) below, $$SR=(S2/S1)\times 100 \quad \text{Formula (1).}$$

2. The insulated wire according to claim 1, wherein the opening area ratio SR is 0.01% or more.

3. The insulated wire according to claim 1, wherein the insulation film has a porosity of 4% by volume or more.

4. The insulated wire according to claim 1, wherein the multiple pores are derived from a thermally decomposable polymer in a form of liquid, or a high boiling point solvent.

5. The insulated wire according to claim 4, wherein the thermally decomposable polymer in the form of liquid is diol-type polypropylene glycol.

6. The insulated wire according to claim 4, wherein the high boiling point solvent is oleyl alcohol, 1-tetradecanol, or 1-dodecanol.

* * * * *